United States Patent Office 2,940,989
Patented June 14, 1960

2,940,989

19-NOR-17αETHINYL-ANDROSTAN-17β-OL-3-ONE

Carl Djerassi, Birmingham, Mich., Howard J. Ringold, Mexico City, Mexico, Franz Sondheimer, Rehovoth, Israel, and George Rosenkranz, Mexico City, Mexico, assignors to Syntex S.A. Mexico City, Mexico, a corporation of Mexico No Drawing. Filed May 11, 1956, Ser. No. 584,178

Claims priority, application Mexico June 1, 1955

1 Claim. (Cl. 260—397.4)

The present invention relates to novel cyclopentanophenanthrene derivatives and to a process for the preparation thereof.

More particularly, the present invention relates to the novel androgenic hormone 19-nor-17α-ethinyl-androstane-17β-ol-3-one (nor-ethinyl-dihydrotestosterone), to certain novel intermediates for the preparation of this compound and to a process for the preparation of nor-ethinyl-dihydrotestosterone involving these intermediates.

The novel end product of the process of the present invention nor-ethinyl-dihydrotestosterone is a valuable androgenic hormone and has especially valuable androgenic and/or anabolic properties.

In accordance with the present invention, it has been discovered that 19-nor-ethinyl-dihydrotestosterone can be prepared from 19-nor-dihydrotestosterone which may be prepared in accordance with U.S. Patent application Serial No. 442,434, filed July 9, 1954, now U.S. Patent No. 2,756,244. It has been discovered that starting with 19-nor-dihydrotestosterone upon treatment with ethyleneglycol in the presence of an acid catalyst, such as p-toluenesulfonic acid, there may be prepared the novel ethyleneketal of 19-nor-dihydrotestosterone. Further, that this ethyleneketal may be oxidized to the novel 3-ethyleneketal of 19-nor-androstan-3,17-dione by the action of an oxidizing agent in a mildly alkaline medium. Reaction of this 3-ethyleneketal of 19-nor-androstan-dione with acetylene in the presence of potassium alkoxide results in a production of the novel desired end product 19-nor-17α-ethinyl-androstan-17β-ol-3-one.

The following equation serves to illustrate the production of the aforementioned novel intermediates and of 19-nor-17α-ethinyl-androstan-17β-ol-3-one:

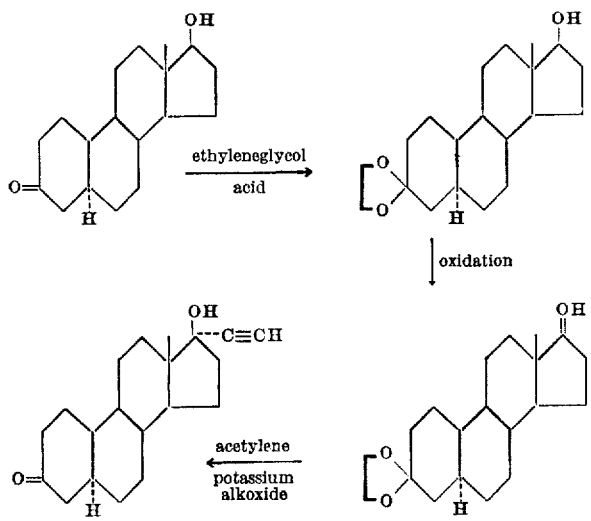

For the first step of the process set forth in the foregoing equation the 19-nor-dihydrotestosterone is dissolved in a suitable organic solvent such as benzene, and ethyleneglycol and an acid such as p-toluenesulfonic acid added thereto. The reaction mixture is refluxed for a substantial period of time of the order of one day with continuous removal of the water formed during the reaction. Upon neutralization, washing and evaporation to dryness the ethyleneketal of 19-nor-dihydrotestosterone is produced, which may be conventionally purified or utilized as such for the next step of the reaction.

In order to prepare the 3-ethyleneketal of 19-nor-androstane-3,17-dione from the ethyleneketal of 19-nor-dihydrotestosterone the later compound is oxidized by an oxidizing agent capable of converting a secondary hydroxy group into a keto group under conditions which would prevent the attack of the ketal group, as for example a mildly alkaline medium. A preferred oxidizing agent for this purpose is chromic acid and a preferred alkaline medium is pyridine solution. For the oxidation, the ethyleneketal of 19-nor-dihydrotestosterone is dissolved in the pyridine and then mixed with a suspension of chromic acid in pyridine. The mixture is kept for a substantial period of time, i.e. of the order of one day at room temperature and then diluted with ethylacetate, filtered and washed with water. Upon drying and evaporation to dryness the ethyleneketal of 19-nor-androstandione is produced which may be purified or utilized as such for the last step of the above-outlined process.

In order to prepare 19-nor-ethinyl-dihydrotestosterone the 19-nor-androstan-dione is dissolved in a suitable organic solvent, such as anhydrous toluene, and mixed with a solution of potassium metal in tertiary amyl alcohol. Other potassium alkoxides may also be used. Nitrogen is passed through the mixture for approximately 15 minutes and thereafter a stream of acetylene is passed through the mixture for a substantial period of time of the order of 15 hours. The reaction mixture is then poured into water, acidified with acid, refluxed for a short period of time on a steam bath and then cooled. The resultant solid product is filtered and crystallized from ethyl acetate to give the desired 19-nor-ethinyl-dihydrotestosterone.

The following specific examples serve to illustrate, but are not intended to limit the present invention:

Example I 30 cc. of ethyleneglycol previously distilled over potassium hydroxide and 1.3 g. of p-toluenesulfonic acid was added to a solution of 7.4 g. of 19-nor-dihydrotestosterone in 130 cc. of benzene and the mixture was refluxed for 20 hours with the use of an adapter for the continuous removal of the water formed during the reaction. At the end of the 20 hours the solution was neutralized with saturated sodium bicarbonate solution, washed with water until neutral, dried over sodium sulfate and evaporated to dryness under vacuum, thus giving 8.3 g. of the ethyleneketal of 19-nor-dihydrotestosterone which was used without further purification for the next experiment described in Example II.

Example II 4.8 g. of the ethyleneketal of 19-nor-dihydrotestosterone was dissolved in 35 cc. of anhydrous pyridine and mixed with a suspension of 4.8 g. of chromic acid in 35 cc. of anhydrous pyridine, suspension which had been prepared by adding the powdered chromic acid to the pyridine in 4 portions until the characteristic dark red color of chromic acid had disappeared, keeping the temperature below 35° C. by cooling in ice. The mixture was kept for twenty hours at room temperature, diluted with ethyl acetate, filtered over celite, the solution was washed with water until the washings were colorless, dried over anhydrous sodium sulfate and evaporated to dryness under vacuum, thus giving 4.1 g. of the ethyleneketal of 19-nor-androstanedione which was used without further purification for the next experiment described in Example No. III.

*Example III*

3 g. of the ethyleneketal of 19-nor-androstanedione was dissolved in 70 cc. of anhydrous toluene and mixed with a solution of 3 g. of potassium metal in 70 cc. of tertiary amyl alcohol, prepared with slight heating under an atmosphere of nitrogen. A stream of nitrogen was passed through the mixture for 15 minutes, followed by a stream of previously washed acetylene, for 15 hours, at the end of which time it was poured into water, acidified with concentrated hydrochloric acid to pH 1, heated under reflux on the steam bath for 30 minutes and cooled in ice. The solid product was filtered (2.5 g.). Crystallization from ethyl acetate and chromatography of the mother liquors on washed alumina afforded 1.5 g. of 19-nor-ethinyl-dihydrotestosterone.

We claim:
19-nor-17α-ethinyl-androstan-17β-ol-3-one.

References Cited in the file of this patent

UNITED STATES PATENTS

| | | |
|---|---|---|
| 2,239,864 | Stavely | Apr. 29, 1941 |
| 2,288,854 | Stavely | July 7, 1942 |
| 2,721,871 | Colton | Oct. 25, 1955 |
| 2,734,066 | Ercoli | Feb. 7, 1956 |
| 2,756,244 | Djerassi | July 24, 1956 |
| 2,759,930 | Sondheimer | Aug. 21, 1956 |
| 2,806,030 | Ringold et al. | Sept. 10, 1957 |
| 2,845,381 | Tindall | July 29, 1958 |

OTHER REFERENCES

J. Am. Chem. Soc., 75, 1716 (1953), ibid., 4117–4118.
J. Chem. Soc. Pt. I, 367 (1950).
J. Org. Chem. 18, 70 (1953).
Pincus, G., Thiman, K.V.: "Hormones," vol. 3, page 548 (1955).